(12) United States Patent
Kamiya et al.

(10) Patent No.: US 12,157,673 B2
(45) Date of Patent: Dec. 3, 2024

(54) METHOD FOR PRODUCING HOLLOW SILICA PARTICLES

(71) Applicants: AGC Inc., Tokyo (JP); AGC Si-Tech Co., Ltd., Kitakyushu (JP)

(72) Inventors: Hiroyuki Kamiya, Chiyoda-ku (JP); Hyunji Kim, Chiyoda-ku (JP); Toshiya Matsubara, Chiyoda-ku (JP)

(73) Assignees: AGC Inc., Tokyo (JP); AGC Si-Tech Co., Ltd., Kitakyushu (JP)

( * ) Notice: Subject to any disclaimer, the term of this patent is extended or adjusted under 35 U.S.C. 154(b) by 7 days.

(21) Appl. No.: 18/090,557

(22) Filed: Dec. 29, 2022

(65) Prior Publication Data

US 2023/0138940 A1    May 4, 2023

Related U.S. Application Data

(63) Continuation of application No. 16/885,487, filed on May 28, 2020, now Pat. No. 11,608,273, which is a (Continued)

(30) Foreign Application Priority Data

Dec. 26, 2017  (JP) ................................. 2017-248972

(51) Int. Cl.
  *C01B 33/193*  (2006.01)
  *B01J 13/08*  (2006.01)
(52) U.S. Cl.
  CPC ............. *C01B 33/193* (2013.01); *B01J 13/08* (2013.01); *C01P 2004/03* (2013.01);
  (Continued)
(58) Field of Classification Search
  CPC ........... B01J 13/08; B01J 13/14; C01B 33/18; C01B 33/187; C01B 33/193;
  (Continued)

(56) References Cited

FOREIGN PATENT DOCUMENTS

| JP | 2000-500113 A | 1/2000 |
|---|---|---|
| JP | 2006-102592 A | 4/2006 |

(Continued)

OTHER PUBLICATIONS

Machine translation JP2017088438A (Year: 2017).*
International Search Report issued Feb. 26, 2019 in PCT/JP2018/047619 filed Dec. 25, 2018, 1 page.
Sun, Q. et al., "The Formation of Well-Defined Hollow Silica Spheres with Multilamellar Shell Structure," Advanced Materials, vol. 15, No. 13, Jul. 4, 2003, 4 pages.

(Continued)

*Primary Examiner* — Victoria H Lynch
(74) *Attorney, Agent, or Firm* — Oblon, McClelland, Maier & Neustadt, L.L.P.

(57) ABSTRACT

To provide hollow silica particles having a dense silica shell layer.

A method for producing hollow silica particles, which comprises:

adjusting the pH of an oil-in-water emulsion containing an aqueous phase, an oil phase and a surfactant to at most 3.0 and adding a first silica material to the oil-in-water emulsion, adding a second silica material to the emulsion having the first silica material added, at its pH of at least 8, in the presence of alkali metal ions, to obtain a hollow silica precursor dispersion, and obtaining a hollow silica precursor from the hollow silica precursor dispersion and obtaining hollow silica particles from the hollow silica precursor.

15 Claims, 3 Drawing Sheets

Related U.S. Application Data continuation of application No. PCT/JP2018/047619, filed on Dec. 25, 2018.

(52) U.S. Cl.
CPC ...... *C01P 2004/04* (2013.01); *C01P 2004/34* (2013.01); *C01P 2004/61* (2013.01); *C01P 2004/62* (2013.01); *C01P 2004/64* (2013.01); *C01P 2006/12* (2013.01); *C01P 2006/80* (2013.01)

(58) Field of Classification Search
CPC .............. C01P 2004/03; C01P 2004/04; C01P 2004/34; C01P 2004/61; C01P 2004/62; C01P 2004/64; C01P 2006/12; C01P 2006/80
See application file for complete search history.

(56) References Cited

FOREIGN PATENT DOCUMENTS

| JP | 2017-88438 A | 5/2017 |
| WO | WO 2007/060884 A1 | 5/2007 |
| WO | WO 2011/091285 A1 | 7/2011 |
| WO | WO 2016137456 A1 | 9/2016 |

OTHER PUBLICATIONS

Schacht et al., Science, vol. 273, Aug. 9, 1996, pp. 768-771. (Year: 1996).

Machine translation JP2006102592A (Year: 2006).

* cited by examiner

METHOD FOR PRODUCING HOLLOW SILICA PARTICLES

CROSS-REFERENCE TO RELATED APPLICATIONS

The present application is a Continuation of U.S. application Ser. No. 16/885,487, now allowed, having a filing date of May 28, 2020 which is a Continuation of International Application PCT/JP2018/047619 having a filing date of Dec. 25, 2018, which is based upon and claims the benefit of priority from Japanese Patent Application No. 2017-248972 filed on Dec. 26, 2017, each of which is incorporated herein by reference in its entirety.

TECHNICAL FIELD

The present invention relates to a method for producing hollow silica particles.

BACKGROUND ART

Hollow silica particles each comprising a shell layer formed of silica and an empty space in the shell layer. Hollow silica particles are, due to their variety of the particle sizes, the pore structures of the shell layer and the surface physical properties, widely used for a catalyst, a catalyst carrier, a cosmetic pigment, a resin filler, an adsorbent, a desiccating agent, a heat insulating material, a coating material, drug delivery system, an optical filter, etc. Further, they are useful also as an antireflection coating film material due to their low refractive index by their hollow shape.

As an example of the method for producing hollow silica particles, an oil-in-water emulsion in which an oil phase is dispersed in an aqueous phase is prepared, a silica material is deposited on oil droplets to prepare oil core/silica shell particles, and the oil droplet components are removed from the particles to obtain hollow silica particles. Since the particles are prepared from an emulsion, hollow silica particles having a particle size of from about several tens nm to 10 μm can be formed.

On the other hand, hollow silica particles having small particle sizes have a thin silica shell layer, and thus the particle strength decreases, and the particles may be broken during use or during storage. If the shell layer has low strength, the particles may be broken when mixed with other material such as ceramic raw material. Further, if the shell layer is porous, the hollow structure in the inside may not be maintained when the particles are mixed with e.g. a solvent.

In Patent Document 1, an initial container bottom content containing water, sodium chloride, precipitated calcium carbonate and sodium silicate is stirred at pH 9, and then an aqueous sodium silicate solution and an aqueous sulfuric acid solution are added, followed by aging, filtration and drying to obtain dry particles, and the dry particles are treated with concentrated hydrochloric acid to remove calcium carbonate thereby to produce hollow silica particles.

Patent Document 2 proposes hollow silica microcapsules having an average pore diameter of from 1.6 to 10 nm. Patent Document 2 proposes a method in which a W/O emulsion or an O/W/O emulsion containing a silicate of an alkali metal in an aqueous phase is obtained, a precipitant is added to the emulsion to form hollow silica microcapsules, followed by predetermined washing with water, drying and baking, and further the baked microcapsules are formed into mesoporous to produce hollow silica microcapsules.

Non-Patent Document 1 proposes a method in which an emulsion using a poly(ethylene oxide)/poly(propylene oxide)/poly(ethylene oxide) block copolymer and sodium silicate are combined to prepare hollow silica particles.

In Non-Patent Document 1, ethanol having trimethylbenzene dissolved therein is added to an aqueous solution having the block copolymer added, to obtain an emulsion, to which an aqueous sodium silicate solution is added to adjust the pH to 5.2, followed by aging, and the resulting white powder is isolated, dried and baked to prepare hollow silica particles. By such a method, hollow silica particles having an average diameter of at most about 1 μm and having a BET specific surface area of about 426 $m^2/g$ are obtained.

PRIOR ART DOCUMENTS

Non-Patent Documents

Non-Patent Document 1: Qianyao Sun et al, "The Formation of Well-Defined Hollow Silica Spheres with Multilamellar Shell Structure", Advanced Materials, 2003, 15 No. 13, July 4.

Patent Documents

Patent Document 1: JP-A-2000-500113
Patent Document 1: JP-A-2006-102592

DISCLOSURE OF INVENTION

Technical Problem

In Patent Document 1, since the core particles are formed of calcium carbonate, the emulsion is alkalified to deposit the silica material on the core particles. By this method, the particle size and the shape of the obtainable hollow particles are restricted by the particle size and the shape of the solid calcium carbonate particles which are the core particles. Further, when calcium carbonate is removed by an acid, the shell layer may have voids, and thus the shell layer cannot sufficiently be densified, and the strength of the shell layer may decrease by the acid treatment.

In Patent Document 1, a liquid material such as a vegetable oil is mentioned as another example of the core particles, however, the silica material may not sufficiently be deposited on the core particles formed of the liquid material under alkaline conditions.

Hollow silica obtained from a W/O emulsion as in Patent Document 2 are not particles having an apparent empty space in their hollow space but particles of which the silica density is gradually decreased from the outermost shell toward the center, since the hollow silica is formed of droplets of an aqueous phase containing an alkali metal silicate.

Further, hollow silica obtained from a W/O/W emulsion are such that the oil droplets at the center becomes the hollow space, and the silica material contained in the aqueous phase as the intermediate layer forms a shell layer. The shell layer, which is formed of the aqueous phase in the intermediate layer, can hardly be densified.

In Non-Patent Document 1, sodium silicate is deposited on oil droplets of an oil-in-water emulsion under acidic conditions, followed by aging, and then the resulting white powder is isolated. By this method, the shell layer of the obtained hollow silica particles cannot sufficiently be densified, and the hollow silica particles tend to be inferior in strength.

Under these circumstances, an object of the present invention is to provide hollow silica particles having a dense silica shell layer.

Solution to Problem

The present invention provides the following.
[1] A method for producing hollow silica particles, which comprises:
adjusting the pH of an oil-in-water emulsion containing an aqueous phase, an oil phase and a surfactant to at most 3.0 and adding a first silica material to the oil-in-water emulsion,
adding a second silica material to the emulsion having the first silica material added, at its pH of at least 8, in the presence of alkali metal ions, to obtain a hollow silica precursor dispersion, and
obtaining a hollow silica precursor from the hollow silica precursor dispersion and obtaining hollow silica particles from the hollow silica precursor.
[2] The method for producing hollow silica particles according to [1], wherein the first silica material and the second silica material are each independently at least one member selected from the group consisting of an alkali metal silicate, activated silicic acid and a silicon alkoxide.
[3] The method for producing hollow silica particles according to [2], wherein the alkali metal silicate is sodium silicate.
[4] The method for producing hollow silica particles according to any one of [1] to [3], wherein as the first silica material, an alkali metal silicate aqueous solution is used.
[5] The method for producing hollow silica particles according to any one of [1] to [4], wherein as the second silica material, at least one of an alkali metal silicate aqueous solution and an activated silicic acid aqueous solution is used.
[6] The method for producing hollow silica particles according to any one of [1] to [5], wherein the second silica material is added to the emulsion heated.
[7] The method for producing hollow silica particles according to any one of [1] to [6], wherein an acid is added to the oil-in-water emulsion to adjust the pH to at least 3, and then as the first silica material an alkali metal silicate aqueous solution is added.
[8] The method for producing hollow silica particles according to any one of [1] to [7], wherein a base is added to the emulsion after adding the first silica material, and then the second silica material is added.
[9] The method for producing hollow silica particles according to any one of [1] to [8], wherein the hollow silica precursor is baked to obtain the hollow silica particles.
[10] The method for producing hollow silica particles according to [9], wherein the baking temperature is from 300 to 800° C.
[11] The method for producing hollow silica particles according to any one of [1] to [10], wherein the surfactant is a polyoxyethylene/polyoxypropylene copolymer.
[12] The method for producing hollow silica particles according to any one of [1] to [11], wherein the obtained hollow silica particles have an average primary particle size of from 10 nm to 10 μm and a BET specific surface area of at most 300 $m^2/g$.
[13] Hollow silica particles, having an average primary particle size of from 10 nm to 10 μm and a BET specific surface area of at most 150 $m^2/g$, and containing an alkali metal component in an amount of at least 500 mass ppm in the shell layer.

Advantageous Effects of Invention

According to the present invention, hollow silica particles having a dense silica shell layer can be provided.

DESCRIPTION OF EMBODIMENTS

Figure 1:
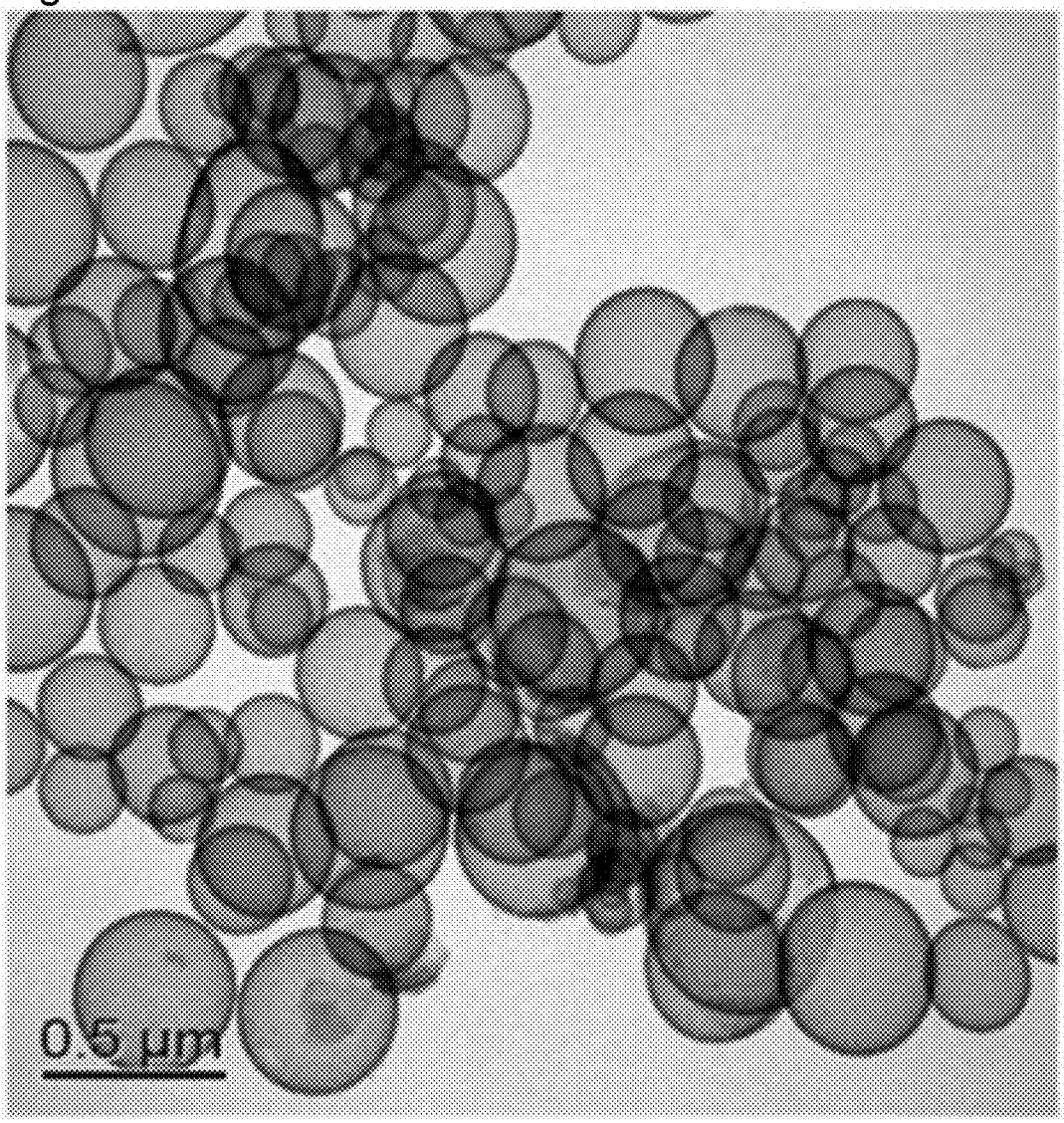
FIG. 1 is a transmission electron microscopic image (TEM image) of the hollow silica particles obtained in Ex. 1.

Now, the present invention will be described in detail. However, it should be understood that the present invention is by no means restricted to the following specific description.

The method for producing hollow silica particles of the present invention is a method for producing hollow silica particles, which comprises:
adjusting the pH of an oil-in-water emulsion containing an aqueous phase, an oil phase and a surfactant to at most 3.0 and adding a first silica material to the oil-in-water emulsion,
adding a second silica material to the emulsion having the first silica material added, at its pH of at least 8, in the presence of alkali metal ions, to obtain a hollow silica precursor dispersion, and
obtaining a hollow silica precursor from the hollow silica precursor dispersion and obtaining hollow silica particles from the hollow silica precursor.

According to the production method, hollow silica particles having a dense silica shell layer can be obtained. Since the shell layer is dense, the particle strength is increased, and their shape can be maintained even when mixed with other material. Further, since the shell layer is dense, the solvent and foreign substances from outside are less likely to invade the hollow portion in the inside.

Further, the silica material is not limited, and for example, even an alkali metal silicate may be used to provide hollow silica particles having a dense silica shell layer.

In this method, an oil-in-water emulsion containing an aqueous phase, an oil phase and a surfactant is used. This oil-in-water emulsion is an emulsion having an oil phase dispersed in water, and when a silica material is added to the emulsion, the silica material is deposited on the oil droplets, whereby oil core/silica shell particles can be formed. Hereinafter, the oil-in-water emulsion may sometimes be referred to simply as an emulsion.

Further, a dispersion having oil core/silica shell particles dispersed, formed by adding the first silica material and not having the second silica material added yet, and a dispersion having oil core/silica shell particles dispersed, having the second silica material added, may also be sometimes referred to as an emulsion. The latter dispersion having oil core/silica shell particles dispersed, having the second silica material added may be the same as the hollow silica precursor dispersion.

The aqueous phase of the emulsion contains mainly water as a solvent. The aqueous phase may further contain a water-soluble organic liquid or an additive such as a water-soluble resin. The proportion of the water in the aqueous phase is preferably from 50 to 100 mass %, more preferably from 90 to 100 mass %.

The oil phase of the emulsion preferably contains a water-insoluble organic liquid which is incompatible with the aqueous phase component. This organic liquid forms droplets in the emulsion thereby to form an oil core portion of the hollow silica precursor.

The organic liquid may, for example, be an aliphatic hydrocarbon such as n-hexane, isohexane, n-heptane, isoheptane, n-octane, isooctane, n-nonane, isononane, n-pentane, isopentane, n-decane, isodecane, n-dodecane, isododecane or pentadecane, a paraffin base oil which is a mixture thereof, an alicyclic hydrocarbon such as cyclopentane, cyclohexane or cyclohexene, a naphthene base oil which is a mixture thereof, an aromatic hydrocarbon such as benzene, toluene, xylene, ethylbenzene, propylbenzene, cumene, mesitylene, tetralin or styrene, an ether such as propyl ether or isopropyl ether, an ester such as ethyl acetate, n-propyl acetate, isopropyl acetate, n-butyl acetate, isobutyl acetate, n-amyl acetate, isoamyl acetate, butyl lactate, methyl propionate, ethyl propionate, butyl propionate, methyl butyrate, ethyl butyrate or butyl butyrate, a vegetable oil such as palm oil, soybean oil or rapeseed oil, or a fluorinated solvent such as a hydrofluorocarbon, a perfluorocarbon or a perfluoropolyether. Further, a polyoxyalkylene glycol to be a hydrophobic liquid at the shell forming reaction temperature may also be used. For example, polypropylene glycol (molecular weight: at least 1,000), or a polyoxyethylene/polyoxypropylene block copolymer having a proportion of oxyethylene units of less than 20 mass % and a cloudy point (1 mass % aqueous solution) of at most 40° C., preferably at most 20° C. may be mentioned. Among them, a polyoxypropylene/polyoxyethylene/polyoxypropylene type block copolymer is preferably used.

They may be used alone or in combination of two or more so long as a single oil phase is formed.

The organic liquid is preferably a $C_{8-16}$, particularly $C_{6-12}$ hydrocarbon. The organic liquid is selected comprehensively considering the workability, the safety against fire, separation property of the hollow silica precursor and the organic liquid, the shape of the hollow silica particles, solubility of the organic liquid in water, etc. The $C_{8-16}$ hydrocarbon may be any of linear, branched and cyclic hydrocarbons so long as it is chemically stable, or may be a mixture of hydrocarbons differing in the number of carbon atoms. The hydrocarbon is preferably a saturated hydrocarbon, more preferably a linear saturated hydrocarbon.

The organic liquid is preferably one having a flash point of from 20 to 90° C., more preferably from 30 to 80° C. If an organic liquid having a flash point of less than 20° C. is used, countermeasures in the work environment are required for fire control due to too low flash point. Further, if an organic liquid having a flash point higher than 90° C. is used, due to small volatility, the amount of the organic liquid deposited on the obtained hollow silica particles may be large.

The emulsion contains a surfactant so as to improve emulsification stability. The surfactant is preferably water-soluble or water-dispersible, and is used preferably as added to the aqueous phase. The surfactant is preferably a nonionic surfactant.

As the nonionic surfactant, for example, the following surfactants may be mentioned.

Polyoxyethylene/polyoxypropylene copolymer type surfactants

Polyoxyethylene sorbitan fatty acid ester type surfactants: polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate Polyoxyethylene fatty acid alcohol ether type surfactants: polyoxyethylene lauryl ether, polyoxyethylene cetyl ether, polyoxyethylene stearyl ether, polyoxyethylene oleyl ether, polyoxyethylene octyl phenol ether, polyoxyethylene nonyl phenol ether Polyoxyethylene fatty acid ester type surfactants: polyoxyethylene glycol monolaurate, polyoxyethylene glycol monostearate, polyoxyethylene glycol monooleate Glycerin fatty acid ester type surfactants: monoglyceryl stearate, monoglyceryl oleate Further, a polyoxyethylene sorbitol fatty acid ester type surfactant, a sugar ester type surfactant, a polyglycerin fatty acid ester type surfactant, a polyoxyethylene hydrogenated caster oil type surfactant or the like may also be used.

They may be used alone or in combination of two or more.

Among the above-mentioned nonionic surfactants, the polyoxyethylene/polyoxypropylene copolymer type surfactant is preferably used. The polyoxyethylene/polyoxypropylene copolymer is a block copolymer having a polyoxyethylene block (EO) and a polyoxypropylene block (PO) bonded. The block copolymer may, for example, be an EO-PO-EO block copolymer or an EO-PO block copolymer, and is preferably an EO-PO-EO block copolymer. The proportion of oxyethylene units in the EO-PO-EO block copolymer is preferably at least 20 mass %, more preferably at least 30 mass %.

The weight average molecular weight of the polyoxyethylene/polyoxypropylene copolymer is preferably from 3,000 to 27,000, more preferably from 6,000 to 19,000.

To the entire polyoxyethylene/polyoxypropylene copolymer, the total amount of the polyoxyethylene block is preferably from 40 to 90 mass %, and the total amount of the polyoxypropylene block is preferably from 10 to 60 mass %.

The amount of the surfactant used varies depending upon the conditions such as the type of the surfactant, HLB (hydrophile-lipophile balance) which is an index indicating the degree of hydrophilicity or hydrophobicity of the surfactant, and the particle size of the silica particles desired, and as the content in the aqueous phase, it is preferably from 500 to 20,000 mass ppm, more preferably from 1,000 to 10,000 mass ppm. When it is at least 500 mass ppm, the emulsion can be more stabilized. Further, when it is at most 20,000 mass ppm, the amount of the surfactant remaining in the hollow silica particles as a product can be reduced.

The aqueous phase and the oil phase may be blended in a mass ratio of from 200:1 to 5:1, preferably from 100:1 to 9:1.

The method of preparing the oil-in-water emulsion is not limited to the following description. The aqueous phase and the oil phase are preliminarily adjusted, and the oil phase is added to the aqueous phase, followed by sufficient mixing or stirring, whereby the oil-in-water emulsion can be prepared. Further, ultrasonic emulsification of physically applying a strong shearing force, emulsification by stirring, high pressure emulsification or the like may be employed. Further, membrane emulsification method of forcing the oil phase through a membrane having fine pores to form fine droplets of the oil phase, which are dispersed in the aqueous phase, phase inversion emulsification method of dissolving the surfactant in the oil phase and then adding the aqueous phase and conducting emulsification, or a phase inversion temperature emulsification method of utilizing a phenomenon that the surfactant changes from water-soluble to oil-soluble at a temperature around the cloudy point may, for example, be mentioned. The emulsification method may be properly selected depending upon the desired particle size, particle size distribution, etc.

In order to decrease the particle size of the obtainable hollow silica particles and to narrow the particle size distribution, it is preferred that the oil phase is sufficiently dispersed in the aqueous phase and the mixed liquid is emulsified. For example, the mixed liquid may be emulsified by means of a high pressure homogenizer under a pressure of at least 100 bar, preferably at least 400 bar.

In the present method, the first silica material is added to the oil-in-water emulsion.

The first silica material may, for example, be an aqueous solution having water-soluble silica dissolved, an aqueous dispersion having solid silica dispersed, a mixture thereof, or at least one member selected from the group consisting of an alkali metal silicate, activated silicic acid and a silicon alkoxide, or an aqueous solution or aqueous dispersion thereof. Among them, at least one member selected from the group consisting of an alkali metal silicate, activated silicic acid and a silicon alkoxide, or an aqueous solution or aqueous dispersion thereof, is preferred in view of availability.

The solid silica may, for example, be silica sol obtained by hydrolyzing an organic silicon compound, or commercially available silica sol.

The alkali metal of the alkali metal silicate may, for example, be lithium, sodium, potassium or rubidium, and among them, in view of availability and the cost, sodium is preferred. That is, alkali metal silicate is preferably sodium silicate. Sodium silicate has a composition represented by $Na_2O \cdot nSiO_2 \cdot mH_2O$. The proportion of sodium to silicate is, by the molar ratio n of $Na_2O/SiO_2$, preferably from 1.0 to 4.0, further preferably from 2.0 to 3.5.

The activated silicic acid is one obtained by subjecting an alkali metal silicate to cation exchange to replace the alkali metal with hydrogen, and the aqueous solution of the activated silicic acid is weakly acidic. For the cation exchange, a hydrogen form cation exchange resin may be used.

The alkali metal silicate or the activated silicic acid is preferably added to the emulsion as dissolved or dispersed in water. The concentration of the alkali metal silicate or activated silicic acid aqueous solution is, as the $SiO_2$ concentration, preferably from 3 to 30 mass %, more preferably from 5 to 25 mass %.

The silicon alkoxide may, for example, be a tetraalkoxysilane such as tetramethoxysilane, tetraethoxysilane or tetrapropoxysilane.

Further, by mixing other metal oxide or the like with the silica material, composite particles may be obtained. Such other metal oxide may, for example, be titanium dioxide, zinc oxide, cerium oxide, copper oxide, iron oxide or lead oxide.

As the first silica material, the silica material may be used alone or as a mixture of two or more. Among them, as the first silica material, an alkali metal silicate aqueous solution, particularly a sodium silicate aqueous solution is preferably used.

In the present method, addition of the first silica material to the oil-in-water emulsion is carried out at a pH of the oil-in-water emulsion of at most 3.0. It is preferred to achieve a pH of at most 3.0 by adding an acid to the oil-in-water emulsion containing the aqueous phase, the oil phase and the surfactant.

As an example of addition of the first silica material, an acid is added to the emulsion and then the sodium silicate aqueous solution is added.

Since a neutral emulsion is once acidified, and then the sodium silicate aqueous solution as an alkali component is added, the entire emulsion can be kept acidic at the time of adding the first silica material.

At the time of adding the first silica material, it is preferred that the pH of the emulsion after adding the acid to the emulsion is adjusted to at most 2, and then the pH is adjusted to at most 3.0 after adding the sodium silicate aqueous solution.

The pH at the time of adding the first silica material to the emulsion is preferably at most 3.0, more preferably at most 2.4, whereby in formation of a first layer coating film by the silica material on the oil droplets in the emulsion via the surfactant, the thickness of the coating film can be made more uniform, and the silica shell layer of the obtainable hollow silica can be made more dense.

The pH at the time of adding the first silica material to the emulsion may be at least 1.

The acid may, for example, be hydrochloric acid, nitric acid, sulfuric acid, acetic acid, perchloric acid, hydrobromic acid, trichloroacetic acid, dichloroacetic acid, methanesulfonic acid or benzenesulfonic acid.

At the time of adding the first silica material, as the amount of the first silica material added, the amount of $SiO_2$ in the first silica material is preferably from 1 to 50 parts by mass, more preferably from 3 to 30 parts by mass per 100 parts by mass of the oil phase contained in the emulsion.

At the time of adding the first silica material, it is preferred to maintain the pH of the emulsion after adding the first silica material to be at most 3.0 for at least 1 minute, more preferably at least 5 minutes, further preferably at least 10 minutes.

Then, it is preferred to maintain the pH of the emulsion having the first silica material added to be at least 5, whereby the first silica material can be fixed to the surface of the oil droplets.

For example, the pH of the emulsion may be kept to be at least 5 by adding a base to the emulsion having the first silica material added.

The base may, for example, be an alkali metal hydroxide such as sodium hydroxide or potassium hydroxide, an alkaline earth metal hydroxide such as magnesium hydroxide or calcium hydroxide, ammonia or an amine.

Otherwise, a method of replacing an anion such as a halogen ion with a hydroxide ion by anion exchange may be employed.

At the time of adding the base, it is preferred to gradually add the base while the emulsion having the silica material added is stirred so as to gradually increase the pH of the emulsion. If stirring is not intense, or a large amount of the base is added all at once, the pH of the emulsion tends to be non-uniform, and the thickness of the first layer coating film may be non-uniform.

It is preferred to maintain the emulsion at a pH of at least 5 preferably with stirring. The retention time may be at least 10 minutes, and is preferably at least one hour, and may be at least 4 hours.

While the emulsion is maintained, the pH of the emulsion is preferably at most 7.

Then, the second silica material is added at a pH of the emulsion of at least 8 in the presence of alkali metal ions, whereby the hollow silica precursor dispersion is obtained. The hollow silica precursor is in the form of oil core/silica shell particles.

As the second silica material, a material similar to the first silica material may be used alone or as a mixture of two or more. Particularly, as the second silica material, at least one of the sodium silicate aqueous solution and the activated silicic acid aqueous solution may be preferably used.

To add the second silica material at a pH of the emulsion of at least 8, a method of adding an alkali metal hydroxide simultaneously with addition of the second silica material may be employed. Otherwise, a method of using sodium silicate as the alkali metal silicate for the second silica material may also be employed. In such a case, a sodium silicate component as an alkali component is added to the weakly acidic emulsion having the pH adjusted to be at least 5 after adding the first silica material, and accordingly the emulsion can be maintained to be alkaline with a pH of at least 8 while the second silica material is added. Further, the alkali metal ions will be present in the emulsion.

The pH of the emulsion when the second silica material is added to the emulsion is preferably at least 8, and may be at least 9, whereby on the first layer coating film by the first silica material, a more dense second layer coating film can be formed.

At the time of adding the first silica material, the method of once acidifying the emulsion and then adjusting the pH to be at least 5 is employed, so that the first silica material is more uniformly deposited on the oil droplets. The first silica layer obtained by such a method is porous and has insufficient denseness and thereby has low strength. By alkalifying the emulsion at the time of adding the second silica material, a high density second silica layer can be formed on the obtained first silica layer. From the silica layer formed in two stages, a dense silica shell layer can be formed.

The pH of the emulsion when the second silica material is added to the emulsion is not particularly limited, and may be at most 13, and may be at most 11. In a case where the pH is too high e.g. in a case where the sodium silicate aqueous solution is used as the second silica material, an acid may be added to adjust the pH. The acid to be used may be the same acid as that used when the first silica material is added.

Addition of the second silica material is carried out in the presence of alkali metal ions. The alkali metal ions may be derived from the first silica material, may be derived from the second silica material, or may be derived from the base added to adjust the pH, or may be incorporated e.g. by addition of an additive to the emulsion. For example, an alkali metal silicate is used as at least one of the first silica material and the second silica material. Otherwise, as the additive to the emulsion, a halide, sulfate, nitrate, aliphatic acid salt or the like of an alkali metal is used.

As the second silica material, for example, at least one of the sodium silicate aqueous solution and the activated silicic acid aqueous solution may be added to the emulsion after adding the first silica material, or both may be added. In a case where both are added, the sodium silicate aqueous solution and the activated silicic acid aqueous solution may be added all at once, or may be added in order.

Addition of the second silica material may be carried out, for example, by conducting a step of adding the sodium silicate aqueous solution and a step of adding the activated silicic acid aqueous solution once or repeatedly two or more times, so as to promote deposition of the silica material on the first silica layer while the pH is adjusted.

The second silica material is preferably added to the emulsion heated so as to promote deposition of the silica material on the first silica layer. The heating temperature is preferably from 30 to 100° C., more preferably from 50 to 80° C. In a case where the heated emulsion is used, after adding the second silica material, the formed emulsion is preferably gradually cooled to room temperature (23° C.).

At the time of adding the second silica material, the amount of the second silica material added is preferably adjusted so that the amount of $SiO_2$ in the second silica material is from 20 to 500 parts by mass, more preferably from 40 to 300 parts by mass per 100 parts by mass of the oil phase.

At the time of adding the second silica material, it is preferred to maintain the emulsion after adding the second silica material to a pH of at least 8 for at least 10 minutes.

By the addition of the first silica material and the addition of the second silica material, the total amount of the first silica material and the second silica material added is preferably adjusted so that the total amount of $SiO_2$ in the first silica material and $SiO_2$ in the second silica material is from 30 to 500 parts by mass, more preferably from 50 to 300 parts by mass per 100 parts by mass of the oil phase.

The silica shell layer of the present invention may be constituted mainly by silica, and as the case requires, other metal component such as Ti or Zr may be incorporated e.g. for the refractive index adjustment. The method of incorporating other metal component is not particularly limited, and for example, in the step of adding the silica material, a metal sol or a metal salt aqueous solution is added simultaneously.

Now, the step of obtaining a hollow silica precursor from the hollow silica precursor dispersion and then obtaining hollow silica particles from the hollow silica precursor will be described.

As the method of obtaining the hollow silica precursor from the hollow silica precursor dispersion, for example, a method of subjecting the dispersion to filtration, a method of removing the aqueous phase by heating, or a method of separating the precursor by sedimentation or centrifugal separation may be mentioned.

As an example, a method of subjecting the dispersion to filtration through a filter of from about 0.1 μm to about 5 μm, and drying the collected hollow silica precursor may be mentioned.

Further, as the case requires, the obtained hollow silica precursor may be washed with water, an acid, an alkali, an organic solvent or the like.

As the method of removing the oil core from the hollow silica precursor to obtain hollow silica particles, for example, a method of baking the hollow silica precursor so that the oil is burnt and decomposed, a method of volatilizing the oil by drying, a method of adding an appropriate additive to decompose the oil, or a method of extracting the oil e.g. with an organic solvent may be mentioned.

As an example, it is preferred to heat the hollow silica precursor at a heating temperature of from 300° C. to 800° C., particularly at from 400° C. to 600° C. for a heating time of from 1 to 8 hours, particularly for from 3 to 6 hours. In such a case, the temperature-raising rate is preferably from 1 to 20° C./min, particularly from 2 to 10° C./min.

The obtained hollow silica particles may be aggregated by the drying or baking step, and thus may be disintegrated into a handleable aggregation size. The disintegration method may, for example, be a method using a mortar, a method using a dry or wet ball mill, a method of using a sieve shaker, or a method of using a disintegrator such as a pin mill, a cutter mill, a hammer mill, a knife mill or a roller mill may, for example, be mentioned.

By the obtained hollow silica particles having an empty space in the shell layer can be confirmed by transmission electron microscopic image (TEM) observation. Spherical particles having an empty space in the inside confirmed by TEM observation are defined as "primary particles". Since the primary particles are partially bonded in the baking or drying step, the obtained hollow silica is in the form of aggregates of secondary particles having the primary particles aggregated in many cases.

The size of the primary particles is obtained by directly observing the particle sizes by TEM observation. Specifically, a portion at which the distribution of the primary particle size in an observation area is considered to be at the same level as distribution of the primary particle size of the entire obtained hollow silica particles, without particles having extremely large or small particle sizes, is observed as enlarged to measure the sizes of the respective primary particles, and the distribution of the sizes of the primary particles obtained from the sizes of the respective primary particles is estimated to be the distribution of the sizes of the entire primary particles.

The average of the sizes of the primary particles is preferably from 10 nm to 10 μm, more preferably from 50 nm to 2 μm, further preferably from 100 nm to 1 μm.

The hollow silica particles preferably have a BET specific surface area of at most 300 m$^2$/g, more preferably at most 200 m$^2$/g, further preferably at most 150 m$^2$/g.

The BET specific surface area is measured by multi-point method using liquid nitrogen, by a specific surface area measuring apparatus "TriStar 113020" manufactured by Shimadzu Corporation, with respect to the hollow silica particles dried to 50 mTorr at 230° C. as a pre-treatment.

The shell thickness of the hollow silica particles relative to the size of the primary particles is preferably from 0.01 to 0.3, more preferably from 0.02 to 0.2, further preferably from 0.03 to 0.1.

If the shell thickness is smaller than 0.01 relative to the size of the primary particles, the strength of the hollow silica particles may decrease. If the ratio is larger than 0.3, the empty space in the inside tends to be small, and properties of the hollow silica particles being hollow cannot be obtained.

The shell thickness is obtained by measuring the shell thicknesses of the respective particles by TEM observation in the same manner as the primary particle size.

The hollow silica particles, which are formed by using oil droplets of the oil-in-water emulsion as core particles, are spherical, preferably true spherical.

In the present invention, the alkali metal component is contained in the shall layer of the obtained hollow silica particles. Substantially no alkali metal component is measured when the silicon alkoxide is used as the silica material.

For example, in a case where the sodium silicate aqueous solution is used as the silica material, the mass concentration of the Na component in the shell of the obtained hollow silica particles is at least 500 mass ppm, or in a higher case, at least 1,000 mass ppm. On the other hand, in the shell of conventional hollow silica particles prepared by using tetraethyl orthosilicate as the silica material, the mass concentration of the Na component is at most 100 mass ppm.

The Na component may be measured by ICP spectrometry with respect to a sample obtained by adding perchloric acid and hydrofluoric acid to the obtained hollow silica and strongly heating the silica to remove silicon as the main component.

Further, in a case where the alkali metal silicate is used as the silica material, the carbon (C) component derived from the material in the shell layer of the obtained hollow silica particles tends to be small as compared with a case where the silicon alkoxide is used as the silica material.

The hollow silica particles produced in accordance with the method of the present invention are characterized by the denseness of the shell layer, and have, for example, a property such that they sediment in water but float in an oil component.

Part of the hollow silica particles produced in accordance with the method of the present invention may be single-hole hollow silica (hollow silica having one hole). This hole is observed by an electron microscope (SEM) and preferably has a hole size of form 5 nm to 3 μm and at most ⅓ of the particle size of the hollow silica particles, preferably from 10 nm to 1 μm and at most ⅕ of the particle size of the hollow silica particles.

Such single-hole hollow silica may be utilized as a modified-release dosage form of perfume or chemicals. That is, a predetermined chemical or the like (preferably liquid or solution) is incorporated into the particles under reduced pressure. The chemical or the like is released in a controlled release manner from the single hole under normal pressure.

The single-hole hollow silica particles may be selected from the particle group of the present invention by the following method for example. First, the hollow silica particles are charged into a liquid medium under atmospheric pressure, and particles floating up are recovered. By using a fluorinated solvent as the liquid medium, a particle group having an apparent specific gravity lower than the liquid medium is easily recovered. Then, the recovered particle group is charged into a liquid medium under reduced pressure. Single-hole hollow silica particles sediment in the liquid medium since the liquid medium infiltrates into the hollow space. The particles which had sedimented in the liquid medium are recovered and dried, whereby a single-hole hollow silica particle group is recovered.

The hollow silica particles of the present invention have an average primary particle size of from 10 nm to 10 μm and a BET specific surface area of at most 300 m$^2$/g, and contains the alkali metal component in the shell layer.

The mass concentration of the alkali metal component in the shell of the hollow silica particles obtained by the present invention is preferably at least 500 mass ppm, more preferably at least 1,000 mass ppm. If the alkali metal component is small, the shell tends to be porous, and a dense shell having high strength cannot be obtained.

The hollow silica particles of the present invention may be produced by the above production method, but are not limited to one produced by the production method.

The details of the average primary particle size, the BET specific surface area, etc. of the hollow silica particles are as mentioned above.

EXAMPLES

Now, the present invention will be described in further detail with reference to Examples, but the present invention is not limited thereto. In the following description, as components in common, the same component is used. Further, unless otherwise specified, "%" means "mass %". Ex. 1 to 17 are Examples of the present invention, and Ex. 21 is a Comparative Example.

Ex. 1

(Preparation of Emulsion)

3.6 g of an EO-PO-EO block copolymer (Kolliphor P188 manufactured by BASF) was added to 1,778 g of pure water, followed by stirring until dissolution.

To the obtained aqueous solution, 18 g of n-dodecane (reagent chemical, manufactured by Wako Pure Chemical Industries, Ltd.) was added, followed by stirring by a homogenizer manufactured by IKA until the entire liquid became uniform to prepare a crude emulsion.

The crude emulsion was emulsified three times under a pressure of 400 bar by using a high pressure emulsifier (LAB1000 manufactured by SMT CO., LTD.) to prepare a fine emulsion.

(First Stage Shell Formation)

To 1,600 g of the obtained fine emulsion, 3.4 g of 35% hydrochloric acid (reagent chemical, manufactured by Wako Pure Chemical Industries, Ltd.) was added to adjust the pH to 1.7.

Then, 34.8 g of a diluted sodium silicate aqueous solution ($SiO_2$ concentration: 6.9 mass %, $Na_2O$ concentration: 2.3 mass %) was added, followed by thorough stirring, and the liquid was maintained at a pH of 2.4 for 15 minutes.

46.1 g of a 0.1 M sodium hydroxide aqueous solution was slowly dropwise added to the liquid with thorough stirring, and stirring was continued for 4 hours, whereby an oil core/silica shell particle dispersion having a pH of 5.2 was obtained.

(Preparation of Activated Silicic Acid)

To 270 g of a well washed hydrogen form cation exchange resin (SK1BH manufactured by Mitsubishi Plastics, Inc.), 380 g of pure water was added, and the temperature was decreased to 5° C.

To the resin dispersion kept at a temperature of 5° C., 360 g of a diluted sodium silicate aqueous solution ($SiO_2$ concentration: 10.3 mass %, $Na_2O$ concentration: 3.5 mass %) was dropwise added little by little with thorough stirring.

After completion of dropwise addition, the resin was removed by filtration to obtain a 5 mass % activated silicic acid aqueous solution.

(Second Stage Shell Formation)

1,300 g of the oil core/silica shell particle dispersion obtained in the first stage shell formation was heated to 70° C., and 35.2 g of a diluted sodium silicate aqueous solution ($SiO_2$ concentration: 3.5 mass %, $Na_2O$ concentration: 1.2 mass %) was added with stirring to adjust the pH to 9.6.

200 g of the above prepared 5 mass % activated silicic acid aqueous solution was slowly dropwise added to the suspension kept at 70° C. with stirring to adjust the pH to 9.2.

Then, 1.4 g of a diluted sodium silicate aqueous solution ($SiO_2$ concentration: 3.5 mass %, $Na_2O$ concentration: 1.2 mass %) was added to adjust the pH to 9.5.

Then, 200 g of the 5 mass % activated silicic acid aqueous solution was slowly dropwise added to adjust the pH to 9.2.

5.2 g of a diluted sodium silicate aqueous solution ($SiO_2$ concentration: 3.5 mass %, $Na_2O$ concentration: 1.2 mass %) was added again to adjust the pH to 9.4.

195 g of the 5 mass % activated silicic acid aqueous solution was slowly dropwise added again to adjust the pH to 8.9. The liquid was slowly cooled to room temperature to obtain a hollow silica precursor dispersion.

(Filtration, Drying, Baking)

1,200 g of the hollow silica precursor dispersion was subjected to pressure filtration (pressure: 0.28 MPa) through a 0.45 μm hydrophilic PTFE membrane filter, followed by drying at 80° C. for 8 hours to obtain a hollow silica precursor.

The obtained precursor was baked at 550° C. for 4 hours (temperature-raising rate: 10° C./min) to obtain 6 g of hollow silica particles.

(Evaluation)

The BET specific surface area of the hollow silica obtained in Ex. 1 by nitrogen adsorption method was 118 $m^2/g$.

Figure 2:
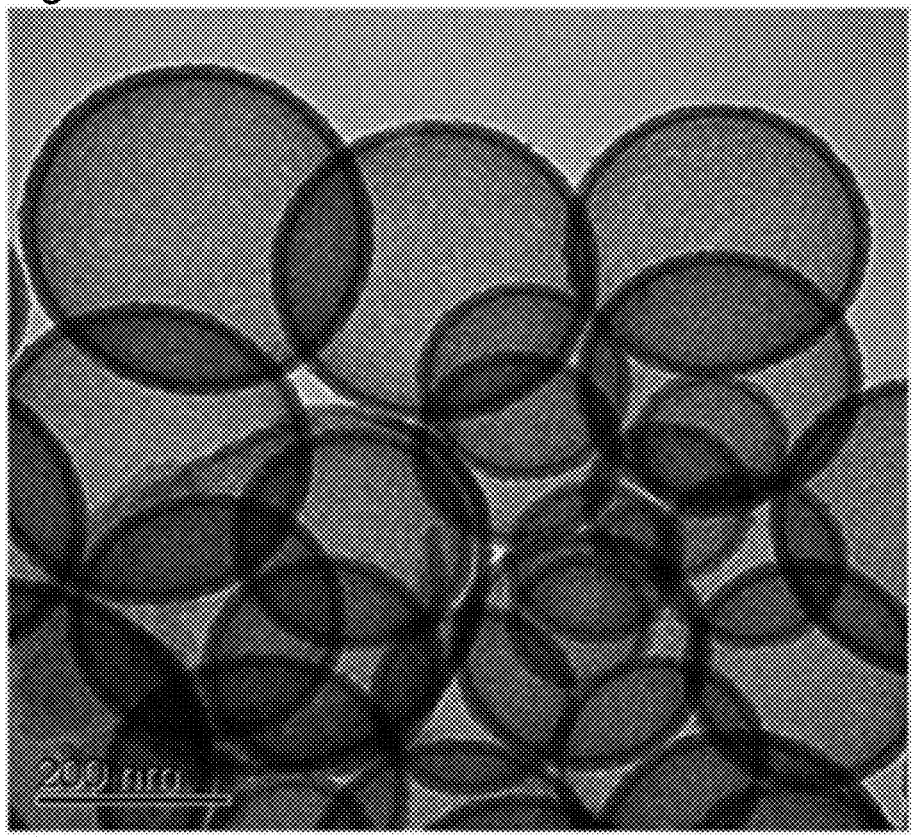
FIG. 2 is a transmission electron microscopic image (TEM image) of the hollow silica particles obtained in Ex. 1.

Transmission electron microscopic images (TEM images) of the hollow silica particles obtained in Ex. 1 are shown in FIGS. 1 and 2.

116 primary particles having clear contours were selected from the TEM image shown in FIG. 1, and their diameters were measured and calculated, whereupon the average was 278 nm. Further, the thickness of the shell in the TEM image shown in FIG. 2 measured was 15 nm.

Figure 3:
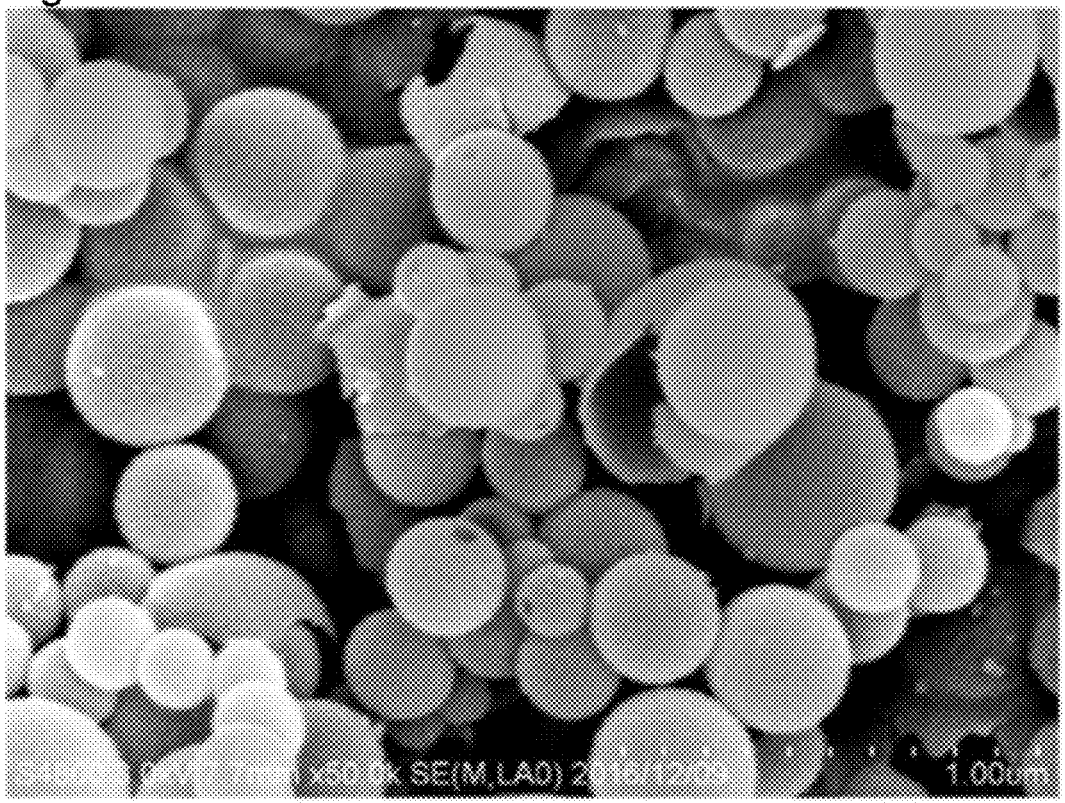
FIG. 3 is a scanning electron microscopic image (SEM image) of the hollow silica particles obtained in Ex. 1 after disintegrated.

A scanning electron microscopic image (SEM image) of the hollow silica particles obtained in Ex. 1 disintegrated by an agate mortar is shown in FIG. 3. It is found from FIG. 3 that the hollow silica particles in Ex. 1 maintained the shape of the hollow particles even after disintegrated in the mortar.

The mass concentration of Na in the shell of the hollow silica obtained in Ex. 1 was 3,800 mass ppm.

Ex. 21

(Preparation of emulsion)

18 g of an EO-PO-EO block copolymer (Kolliphor P188 manufactured by BASF) was added to 1,765 g of pure water, followed by stirring until dissolution.

To the obtained aqueous solution, 18 g of n-dodecane was added, followed by stirring by a homogenizer manufactured by IKA until the entire liquid becomes uniform to prepare a crude emulsion.

The crude emulsion was emulsified three times under a pressure of 400 bar by using a high pressure emulsifier (LAB1000 manufactured by SMT CO., LTD.) to prepare a fine emulsion.

(Formation of Hollow Silica Precursor)

9.2 g of 35% hydrochloric acid was added to 1,700 g of the obtained fine emulsion to adjust the pH to 1.5.

Then, 123.3 g of a diluted sodium silicate aqueous solution ($SiO_2$ concentration: 6.9 mass %, $Na_2O$ concentration: 2.3 mass %) was added, followed by thorough stirring, and the liquid was maintained at a pH of 2.2 for 15 minutes.

127.1 g of a 0.1 M sodium hydroxide aqueous solution was slowly dropwise added to the liquid with thorough stirring, and stirring was continued for 4 hours, whereupon a hollow silica precursor dispersion having a pH of 5.2 was obtained.

(Filtration, Drying, Baking)

600 g of the hollow silica precursor dispersion was subjected to pressure filtration through a 0.45 μm hydrophilic PTFE membrane filter, followed by drying at 80° C. for 8 hours to obtain a hollow silica precursor.

The obtained precursor was baked at 550° C. for 4 hours (temperature-raising rate: 10° C./min) to obtain 3 g of hollow silica particles.

(Evaluation)

The BET specific surface area of the hollow silica obtained in Ex. 21 by nitrogen adsorption method was 554 m²/g.

Figure 4:
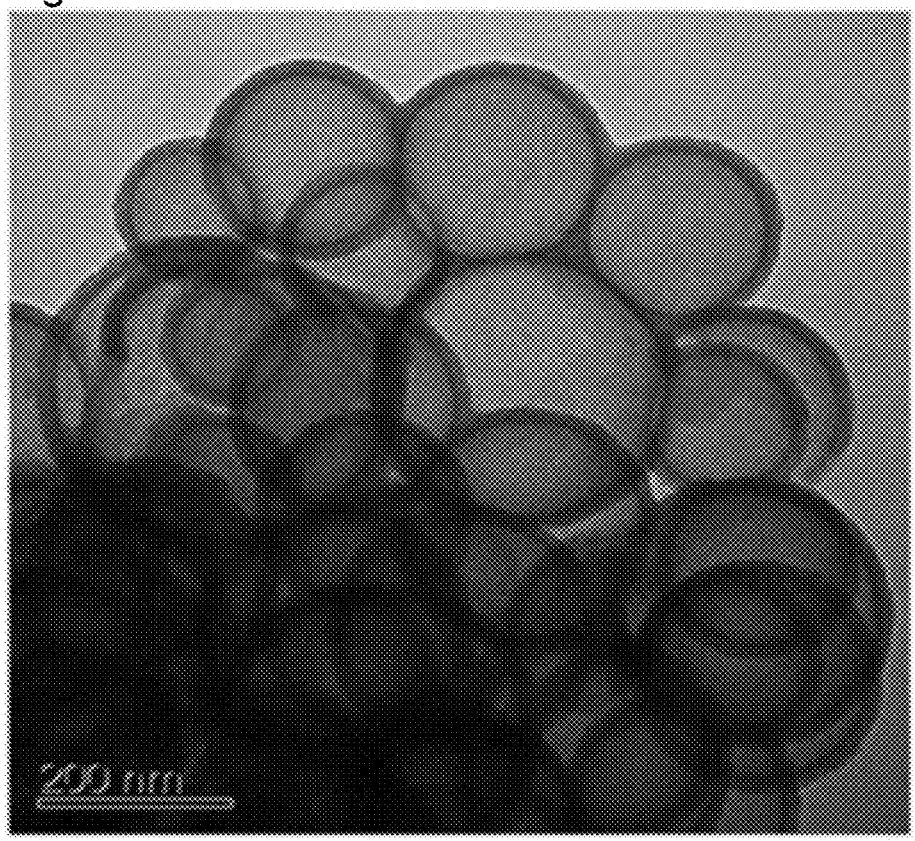
FIG. 4 is a transmission electron microscopic image (TEM image) of the hollow silica particles obtained in Ex. 21.

A TEM image of the hollow silica particles obtained in Ex. 21 is shown in FIG. 4.

In the TEM image shown in FIG. 4, the shell layer is vague as compared with that in the TEM image shown in FIG. 2, thus indicating a low denseness of the shell as compared with Ex. 1.

Figure 5:
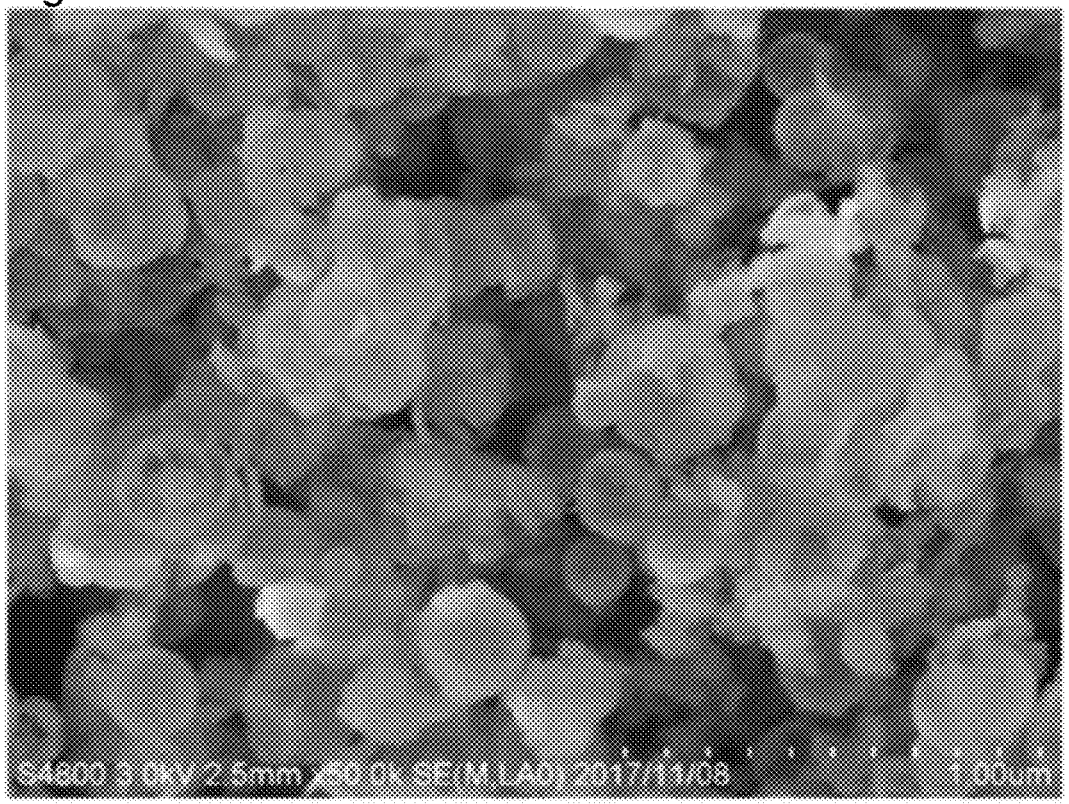
FIG. 5 is a scanning electron microscopic image (SEM image) of the hollow silica particles obtained in Ex. 21 after disintegrated.

A SEM image of the hollow silica particles obtained in Ex. 21 disintegrated by an agate mortar is shown in FIG. 5. It is found from FIG. 5 that most of the hollow silica particles in Ex. 21 collapsed since the silica shell strength was insufficient, and fragments of the silica shell were present in a large amount.

Ex. 2

(Preparation of Emulsion)

2.4 g of an EO-PO-EO block copolymer (Kolliphor P188 manufactured by BASF) was added to 480 g of pure water, followed by stirring until dissolution. To the obtained aqueous solution, 16 g of n-dodecane was added, followed by stirring by a homogenizer manufactured by IKA until the entire liquid became uniform to prepare a crude emulsion.

The crude emulsion was emulsified three times under a pressure of 400 bar by using a high pressure emulsifier (LAB1000 manufactured by SMT CO., LTD.) to prepare a fine emulsion.

(First Stage Shell Formation)

To 442 g of the obtained fine emulsion, 9 g of 2M hydrochloric acid was added to adjust the pH to 1.5.

Then, 12.3 g of a diluted sodium silicate aqueous solution ($SiO_2$ concentration: 10.4 mass %, $Na_2O$ concentration: 3.6 mass %) was added, followed by thorough stirring, and the liquid was maintained at a pH of 2.1 for 15 minutes.

4 g of a 0.1 M sodium hydroxide aqueous solution was slowly dropwise added to the liquid with thorough stirring, and stirring was continued for 1 hour, whereby an oil core/silica shell particle dispersion having a pH of 5.8 was obtained.

(Second Stage Shell Formation)

400 g of the oil core/silica shell particle dispersion obtained in First stage shell formation was heated to 30° C., and 3 g of a diluted sodium silicate aqueous solution ($SiO_2$ concentration: 10.4 mass %, $Na_2O$ concentration: 3.6 mass %) was slowly added with stirring to adjust the pH to 9.

Then, 127 g of a diluted sodium silicate aqueous solution ($SiO_2$ concentration: 10.4 mass %, $Na_2O$ concentration: 3.6 mass %) was gradually added together with 0.5M hydrochloric acid to adjust the pH to 9.

The suspension was maintained at 30° C. for 2 days and slowly cooled to room temperature to obtain a hollow silica precursor dispersion.

(Filtration, Drying, Baking)

770 g of the hollow silica precursor dispersion was subjected to pressure filtration (pressure: 0.28 MPa) through a 0.45 μm hydrophilic PTFE membrane filter.

The cake collected by filtration was dried in a nitrogen atmosphere at 60° C. for 1 hour and at 400° C. for 4 hours (temperature-raising rate: 5° C./min) to obtain a hollow silica precursor.

The obtained precursor was baked at 550° C. for 4 hours (temperature-raising rate: 5° C./min) to obtain 13.8 g of hollow silica particles.

The specific surface area of the hollow silica particles obtained in Ex. 2 is shown in Table 1.

Ex. 3 to 5

Silica particles were prepared in the same manner as in Ex. 2 except that the reaction temperature and the retention temperature in Second stage shell formation were changed.

The reaction temperature and the retention temperature in Second stage shell formation and the specific surface area of the obtained hollow silica particles in Ex. 3 to 5 are shown in Table 1.

The higher the reaction temperature and the retention temperature in Second stage shell formation, the smaller the specific surface area, thus indicating that hollow silica particles having a dense shell can be prepared.

TABLE 1

|  | Ex. 2 | Ex. 3 | Ex. 4 | Ex. 5 |
|---|---|---|---|---|
| Reaction temperature and retention temperature (° C.) in Second stage shell formation | 30 | 50 | 60 | 70 |
| Specific surface area (m²/g) | 298 | 272 | 160 | 60 |

Ex. 6 to 13

Silica particles were prepared in the same manner as in Ex. 5 except that the EO-PO-EO block copolymer was changed. EO-PO-EO block copolymers used in the respective Ex. are shown in Table 2.

Hollow silica particles could be obtained in all of Ex. 6 to 13, however, in Ex. 6, 7 and 11, hollow silica particles having one hole were observed in a large amount.

TABLE 2

| | EO-PO-EO block copolymer used | | | | | |
|---|---|---|---|---|---|---|
| | Manufactured by | Product name | Product No. | Molecular weight (g/mol) | EO proportion (wt %) | Specific surface area (m²/g) |
| Ex. 6 | BASF | Pluronic | PE 10500 | 6500 | 50 | 70 |
| Ex. 7 | | | PE 10400 | 8125 | 40 | 85 |
| Ex. 8 | ADEKA | Pluronic | F-108 | 16250 | 80 | 38 |
| Ex. 9 | | | F-88 | 11250 | 80 | 76 |
| Ex. 10 | | | F-68 | 8750 | 80 | 37 |
| Ex. 11 | | | P-85 | 11250 | 50 | 102 |
| Ex. 12 | NOF | PLONON | #208 | 8600 | 76 | 95 |
| Ex. 13 | CORPORATION | | #188 | 8310 | 80 | 48 |

Ex. 14

Silica particles were prepared in the same manner as in Ex. 5 except that the amount of the EO-PO-EO block copolymer (Kolliphor P188 manufactured by BASF) added was 10 times.

The specific surface area of the hollow silica particles obtained in Ex. 14 was 140 m²/g.

Ex. 15

(Preparation of Emulsion)

2.4 g of an EO-PO-EO block copolymer (F-68 manufactured by ADEKA Corporation) was added to 480 g of pure water, followed by stirring until dissolution. 16 g of n-dodecane was added to the aqueous solution, followed by stirring by a homogenizer manufactured by IKA until the entire liquid becomes uniform, to prepare a crude emulsion.

Ultrasonic irradiation was conducted twice to the crude emulsion by an ultrasonic dispersing machine (GSCVP-600 manufactured by Sonic Technology Co., Ltd.) at an intensity of V-Level 3.4 for one minute to prepare a fine emulsion.

First stage shell formation and subsequent steps were conducted in the same manner as in Ex. 5 to prepare silica particles, except that after First stage shell formation, the liquid having the silica material added was not maintained at pH 5, and a 1M sodium hydroxide aqueous solution was added to pH 9.

The specific surface area of the hollow silica particles obtained in Ex. 15 was 170 m²/g.

Ex. 16

(Preparation of Emulsion)

4.9 g of an EO-PO-EO block copolymer (Pluronic PE10400 manufactured by BASF) was added to 462 g of pure water, followed by stirring until dissolution.

33 g of ASAHIKLIN AC-6000 (manufactured by AGC Inc., 1,1,1,2,2,3,3,4,4,5,5,6,6-tridecafluorooctane) as a fluorinated solvent was added to the aqueous solution, followed by stirring by a homogenizer manufactured by IKA until the entire liquid becomes uniform, to prepare a crude emulsion.

Ultrasonic irradiation was conducted twice to the crude emulsion by an ultrasonic dispersing machine (GSCVP-600 manufactured by Sonic Technology Co., Ltd.) at an intensity of V-Level 3.4 for one minute to prepare a fine emulsion.
(First Stage Shell Formation), (Second Stage Shell Formation), (Filtration)

First stage shell formation and Second stage shell formation, and Filtration were conducted in the same manner as in Ex. 5 to prepare silica particles.
(Drying)

The cake collected by filtration was dried at 60° C. for 2 days to remove AC-6000 thereby to obtain 8 g of hollow silica particles.

The specific surface area of the hollow silica particles obtained in Ex. 16 was 80 m²/g.

Ex. 17

(Preparation of Emulsion)

13 g of an EO-PO-EO block copolymer (PE10500 manufactured by BASF) was added to 174 g of pure water and dissolved. The solution was maintained at 5° C., and 13 g of a PO-EO/PO block copolymer (25R-1 manufactured by ADEKA Corporation) was added and dissolved to obtain a transparent aqueous solution. 300 g of pure water was heated to 60° C., to which the block copolymer mixed solution was dropwise added with stirring, whereby a fine emulsion having a droplet size of about 300 nm was obtained.

First stage shell formation and subsequent steps were conducted in the same manner as in Ex. 5 to prepare silica particles, except that First stage shell formation was conducted at 60° C., and the liquid having the silica material added was not maintained at pH 5, and a 1M sodium hydroxide aqueous solution was added to pH 9.

The specific surface area of the hollow silica particles obtained in Ex. 17 was 160 m²/g.

What is claimed is:

1. A method for producing hollow silica particles, which comprises:
    adjusting the pH of an oil-in-water emulsion containing an aqueous phase, an oil phase and a surfactant to at most 3.0 and adding a first silica material to the oil-in-water emulsion,
    heating the oil-in-water emulsion having the first silica material added to a temperature of 30 to 100° C. and adding a second silica material to the oil-in-water emulsion having the first silica material added, at its pH of at least 8, in the presence of alkali metal ions, to obtain a hollow silica precursor dispersion, and
    obtaining a hollow silica precursor from the hollow silica precursor dispersion and obtaining hollow silica particles from the hollow silica precursor.

2. The method for producing hollow silica particles according to claim 1, wherein the first silica material and the second silica material are each independently at least one member selected from the group consisting of an alkali metal silicate, activated silicic acid and a silicon alkoxide.

3. The method for producing hollow silica particles according to claim 2, wherein the alkali metal silicate is sodium silicate.

4. The method for producing hollow silica particles according to claim 1, wherein as the first silica material, an alkali metal silicate aqueous solution is used.

5. The method for producing hollow silica particles according to claim 1, wherein the second silica material is at least one selected from the group consisting of an alkali metal silicate aqueous solution and an activated silicic acid aqueous solution.

6. The method for producing hollow silica particles according to claim 1, wherein a base is added to the oil-in-water emulsion after adding the first silica material, and then the second silica material is added.

7. The method for producing hollow silica particles according to claim 1, wherein the hollow silica precursor is baked to obtain the hollow silica particles.

8. The method for producing hollow silica particles according to claim 7, wherein the baking temperature is from 300 to 800° C.

9. The method for producing hollow silica particles according to claim 1, wherein the surfactant is a polyoxyethylene/polyoxypropylene copolymer.

10. The method for producing hollow silica particles according to claim 1, wherein the obtained hollow silica particles have an average primary particle size of from 10 nm to 10 μm and a BET specific surface area of at most 300 m²/g.

11. The method for producing hollow silica particles according to claim 1, wherein the oil-in-water emulsion having the first silica material added is heated to a temperature of 50 to 80° C.

12. The method for producing hollow silica particles according to claim 1, wherein the first silica material is an aqueous solution comprising a dissolved water-soluble silica, an aqueous dispersion comprising a dispersed solid silica, a mixture thereof, or at least one member selected from the group consisting of an alkali metal silicate, an activated silicic acid, an aqueous solution thereof and an aqueous dispersion thereof.

13. The method for producing hollow silica particles according to claim 1, wherein the second silica material is an aqueous solution comprising a dissolved water-soluble silica, an aqueous dispersion comprising a dispersed solid silica, a mixture thereof, or at least one member selected from the group consisting of an alkali metal silicate, an activated silicic acid, an aqueous solution thereof and an aqueous dispersion thereof.

14. A method for producing hollow silica particles, which comprises:
   forming an acidified oil-in-water emulsion containing an aqueous phase, an oil phase and a surfactant having a pH of at most 3.0;
   adding a first silica material to the acidified oil-in-water emulsion to form a first silica-containing oil-in-water emulsion,
   adjusting the pH of the first silica-containing oil-in-water emulsion to at least 8 and heating the first silica-containing oil-in-water emulsion to a temperature of from 30 to 100° C.;
   adding a second silica material to the first silica-containing oil-in-water emulsion in the presence of alkali metal ions to obtain a hollow silica precursor dispersion; and
   heating the hollow silica precursor dispersion to form a hollow silica precursor; and
   obtaining the hollow silica particles from the hollow silica precursor.

15. The method for producing hollow silica particles according to claim 14, wherein the first silica-containing oil-in-water emulsion is heated to a temperature of from 50 to 80° C.

* * * * *